Sept. 23, 1930.    W. W. WOODRUFF, 3D., ET AL    1,776,531

SUSPENSION CLAMP

Filed March 27, 1926

Inventors
William Warren Woodruff 3rd
Ralph L. Jenner
By their Attorney
Howard W. Dix Patented Sept. 23, 1930

1,776,531

UNITED STATES PATENT OFFICE

WILLIAM WARREN WOODRUFF, 3d, OF SWARTHMORE, AND RALPH L. JENNER, OF GERMANTOWN, PENNSYLVANIA

SUSPENSION CLAMP

Application filed March 27, 1926. Serial No. 97,852.

This invention relates to an improved type of suspension clamp preferably employed for supporting the electrical conductors of a transmission line. The invention further relates to a novel construction of such a clamp that will satisfactorily function to prevent creepage of the conductor while being supported in its normal position and that will permit a temporary release of the conductor so that it may slide somewhat through the clamp when there exists an abnormal condition of supporting.

It is well known that the usual practice in the construction of transmission lines is to suspend the wires or conductors from a post or tower by means of a supporting clamp connected to one or more insulators which in turn are connected to a cross-arm mounted on the tower.

In designing a transmission line it has been found that the bases for figuring the required strengths of the tower and of the insulators are the vertical or transverse load, which is the weight of the conductor with the ice that may collect thereon, and a transverse load due to wind against the conductor and the ice, and a longitudinal load, which is the pull in the conductor due to its weight and stringing tension together with a high velocity wind acting on the conductor and its ice covering. This longitudinal load is normally balanced on tangents where the insulators are in suspension and is only transmitted to the tower in case of a broken conductor. It is commonly assumed in tower design that one third or more of the conductors be broken. When the conductors are of relatively small cross-sections the transverse load is substantially equal to the longitudinal load and the design of the towers is not generally controlled by the assumed probable longitudinal load. In the larger capacity transmission lines the conductors are of larger size and it has been found that the stringing tension together with the ice and wind loads thereon which, as heretofore stated constitute the total probable horizontal load, are the controlling factors.

It may be stated that in nearly all transmission lines that the number of towers positioned along a substantially straight line constitute about 80–90% of the total number of towers of the line. The end and corner towers are necessarily designed for full strength.

Under the present practice it has also been found from experience that the towers forming the 80–90% must be designed to withstand the loads imposed by the shock resulting from the breaking of any one or a number of the conductors. The type of clamps now in use do not provide for an automatic release of the conductor when abnormal conditions obtain and consequently when a conductor breaks there will be a severe shock on the tower and thus the requirement of towers of great strength capacity although this great strength is not needed except in the emergency of breakage, but it must, nevertheless, be present.

The improved clamp herein disclosed provides a suitable form of support for the conductors so that these conductors are held firmly under normal conditions and so that when excessive abnormal conditions obtain there will be a releasing of the conductor so that it may slide somewhat through the clamp and thereby prevent breakage of the tower.

With this improved type of clamp it has been found from experience that the design of the 80–90% of the towers may be modified so that there is a very material saving in the size and strength of the towers thereby obviously creating a very substantial saving in steel in the large number of the towers required. This material saving is practically all dependent on the fact that a satisfactory type of conductor clamp has been provided for eliminating the possibility of the abnormal load on a tower by reason of the breaking of a conductor.

It may be stated that various types of clamps have been designed to accomplish the function herein required, but it has been found under actual tests of such clamps that they have failed due probably to the fact that there is no actual slipping of the conductor in respect to the clamp although the clamps were designed to accomplish that purpose.

The main object of this invention is, therefore, to provide an improved type of conductor supporting means which will permit the building of transmission lines at a very material saving while at the same time providing a satisfactory factor of safety.

A more detailed object of the invention is to provide an improved suspension clamp for the conductors of a transmission line, which clamp provides satisfactory firm holding of the conductor under normal conditions and provides for suitable releasing of the conductor longitudinally under abnormal conditions of suspension and thereby prevent the transmission of abnormal loads to the tower.

It is a further object of this invention to provide an improved type of electrical conductor suspension clamp which automatically clamps or binds the conductor to prevent creepage thereof under normal conditions and to automatically release the clamping when the conductor moves the clamp a predetermined amount from its normal position.

Another object of this invention is to provide an improved cable or conductor supporting clamp which normally clamps or binds the conductor but which after a predetermined movement from its normal position will quickly and entirely release the clamp to permit the conductor to slide through the clamp and will after an initial release of the conductor act to gradually grip the conductor and bring it to rest before too much sag has been formed in the conductor line.

It is a further object of the invention to provide a novel type of construction of a suspension clamp which eliminates abnormal loads being transmitted to the tower.

Further objects and advantages of this invention will be appreciated when reading the detailed description set forth below.

The preferred embodiment of this invention is illustrated in the accompanying drawings wherein.

Figure 1:
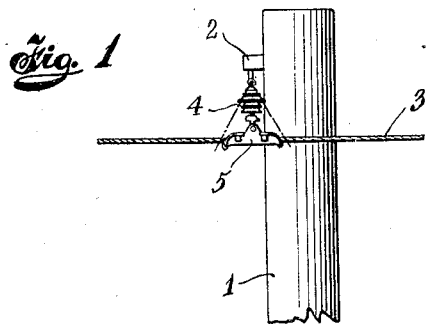
Fig. 1 is a general view of the articles required for suspending a conductor of a transmission line.

Referring now to these drawings there is illustrated in Fig. 1 a portion of a tower 1 of a transmission line and a suitable cross-arm 2 which extends outwardly from the tower so that a wire or conductor 3 of the transmission line suspended by the cross-arm may be supported at some distance from the tower to prevent electrical leakage. It is usual to provide one or more insulators 4 between the cross-arm 2 and a suitable suspension clamp 5. As shown in this drawing there is provided one insulator but more may be employed if desired.

The clamp discloseed for accomplishing the purposes of this invention may be of any desired construction so long as it satisfactorily provides for the clamping or binding of the conductor within the clamp while normal conditions of suspension of the conductor maintain and that will automatically release the clamping or binding when there is a substantial unbalanced horizontal pull or load on the conductor which carries the clamp materially out of its normal suspension position, and that will create a gradual gripping on the conductor after sliding has started until the sliding has stopped thereby preventing too much sag in the conductor line.

Figure 2:
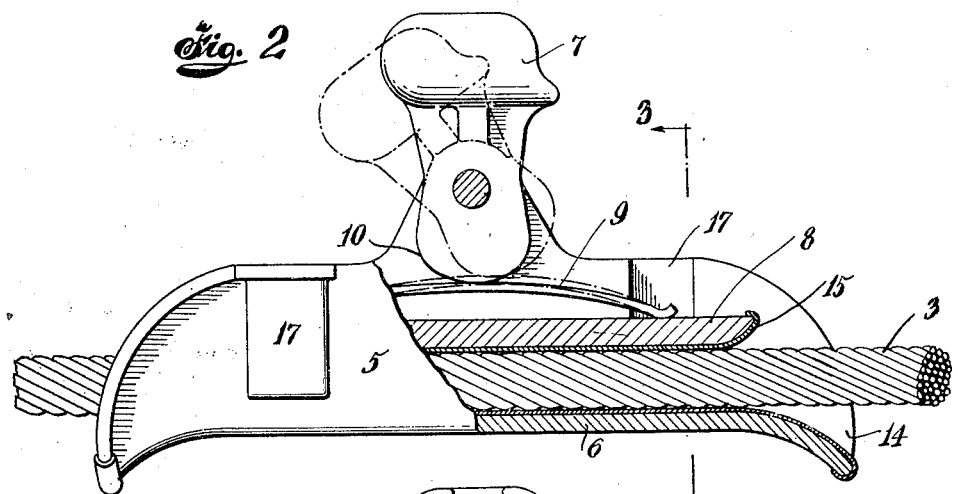
Fig. 2 is an elevational view, partly in section, of the improved type of clamp employed for holding the conductor.
Figure 3:
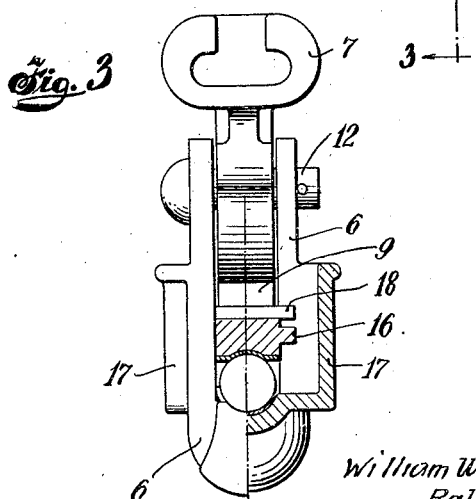
Fig. 3 is a sectional view, in part, taken on the line 3—3 of Fig. 2.

The preferred construction which has been found satisfactorily in operations is illustrated in Figs. 2 and 3 and is composed of a body 6, a member 7 which is carried by the body 6 and which is fastened to the insulator 4 in any suitable manner. The preferred form of means for clamping or binding the conductor within the body 6 constituties a plate 8, a spring 9, and a cam surface 10 formed on the bottom portion of the member 7. In this preferred type of clamp it will be noted that the conductor 3 is held within the body 6 of the clamp. It will be understood that if desired the clamp may have any desired form of means for permanently engaging the conductor and which means in turn would be received within the body 6 or associated therewith in any desired manner so that a binding would be provided to prevent the conductor from sliding relatively to the attaching member 7 under normal conditions of suspension, and that would function to be released under abnormal conditions of suspension, and that also functions to give a gradually increasing gripping after releasing.

In the suspension clamp illustrated which is constructed to receive and hold the conductor, there is provided a satisfactory means for binding the conductor within the body and in this instance the plate 8 cooperates with the body 6 to pinch or bind the conductor so that it will not move through the body until the pinching or binding is released. The attaching member 7 is preferably pivoted to the body 6 by a suitable bolt 12 as clearly illustrated in Fig. 3 and by reason of this construction the body 6 is permitted to move out of its normal vertical position while at the same time the cam surface 10 on member 7 functions to vary the pressure of the spring 9 on the plate 8 and thereby vary the binding effect on the conductor within the body 6.

When a longitudinal load on the conductor has developed to such a point that the clamp 5 is drawn to the right, for instance, the axis member 7 will remain substantially in line with the axis of the insulator. This will be appreciated as it is seen that member 7 is pivoted to the clamp 5 by means of the bolt 12. The axis of the attaching member 7 while being maintained in line with the axis of the insulator and while the body 6 is being moved, while remaining substantially horizontal to the right it will be noted that the cam surface 10 will change its position in respect to spring 9 and due to the construction of this cam surface the spring 9 is released somewhat so that it approaches the position shown in dotted lines. In accomplishing this result the weight of the conductor always tends to pull the body 6 away from the attaching member 7 and, therefore, when the body 6 is moved out of its normal vertical suspended position there is this weight force which will maintain the insulator and the attaching member 7 in substantially a straight line which line forms an angle with the longitudinal axis of the body 6. It is desired to so construct or form this cam surface that the clamp may be moved through an angle of substantially 30° from its normal vertical position before the binding pressure on the conductor 3 is released to a sufficient extent to permit the conductor to slide relatively through the body 6 or relative to the attaching member 7. It may be noted after a relative movement of the conductor through the body of the clamp that the clamp will tend to return to its normal position due to the weight of the conductor and will thereby cause the cam surface 10 to forcibly engage the spring 9 to compress the same and thereby exert a binding pressure on the conductor through the plate 8. This action, of course, will be appreciated as giving a snubbing effect to the movement of the conductor through the clamp. It will, therefore, be seen that it is possible not to have a very material longitudinal movement of the conductor through the clamp at any one releasing, but any movement of the conductor under the conditions of abnormal suspension will relieve the strain so that the tower and the insulators are not strained to their breaking points.

It will be observed that the movement of the clamp may be either to the right or left of its vertical suspended position and that the same releasing and snubbing effect will obtain irrespective of which side of its normal position it is moved. It will, therefore, be seen that there is a freedom of movement of 60° before the releasing of the binding effect permits a relative movement of the conductor to the clamp. While this total angle of 60° of movement has been found to be advisable and satisfactory, it is to be understood that various other requirements may be made by satisfactorily designing the cam surface, the spring 9 and the construction and design of plate 8, or any one of them.

The preferred form of clamp herein disclosed provides for a unit member construction which includes the means for attaching the clamp to the insulator and the cam surface, i. e., member 7. It is to be understood that these may be separate elements and be brought into cooperation due to the relative position of the member 7 to the horizontal position of the body 6. The broad conception being, however, that when the attaching member 7 is moved to an angle to the normal horizontal position of the body member 6 that there should be some change in the binding effect on the conductor held within the clamp, and that after the body 6 has been moved to definite and predetermined distance from its normal position there should be a release of the conductor so that it may slide through the body 6 and thereby prevent the excessive strains on the tower and insulators. In addition, the clamp automatically operates to prevent too much sag in the conductor line on one side of the clamp, for after there has been some slipping of the conductor through the clamp the weight of the conductor tends to bring the clamp and the insulators back into the normal vertical positions and in doing so the cam 10 acts to compress the spring 9 and thereby creates a gripping or snubbing action on the conductor. This gripping becomes effective gradually in accordance with the amount of the angle between the line of the insulators from their normal vertical positions. With this type of clamp it will be seen that when the release, to permit sliding, has taken place that the towers may be designed so that they will not be required to take the abnormal load due to the breaking of a conductor.

If desirable the suspension clamp may be provided with a coating or cover within the body so that the conditions of support and slipping of the conductor may be easily obtained and for this purpose there is provided a suitable liner 14 which preferably is of aluminum or any other suitable metal or material. It is desired also to provide the underside of plate 8 with a suitable coating 15 preferably of aluminum or any other suitable material.

Another feature of construction of this improved clamp is to provide the plate 8 with projections 16 which may be received within recesses 17 formed in the body 6 so that the plate 8 will always be satisfactorily maintained within the clamp. For the same reason the spring 9 is also provided with projections as indicated at 18 and which are shown as being received within recesses 17.

It wil be seen that the preferred construction of this novel clamp provides cooperating pieces in the forms of spring 9 and plate 8 between the cam surface 10 and the conductor 3. It has been desirable to provide these intermediate pieces so that practical and satisfactory operation of the clamp may be obtained. It is understood, however, that in some instances, if desired, the cam surface 10 may operate directly on the conductor 3 or plate 8. From the manufacturing point of view it has been found that the extra cost of the spring 9 and plate 8 does not add materially to the total expense, for if these elements are eliminated it then becomes necessary to manufacture both the body 6 and the cam surface 10 with greater precision. In the preferred construction herein disclosed the manufacture of all of the elements on a large scale with relatively wide manufacturing tolerances is permitted while at the same time the satisfactory operation of the device as so manufactured has been proven by experience.

It will be seen from the foregoing description that a satisfactory form of suspension means or clamp has been provided for the conductors of a transmission line, and that such clamp satisfactorily prevents creepage of the conductors while at the same time it provides a satisfactory means of releasing the conductors to prevent heavy loading of the tower or structure under abnormal conditions of a broken conductor. For these reasons it will be seen that the towers of the transmission line may be designed so as not to require the enormous amount of extra steel.

While the description heretofore given has been directed to a particular example and use of the clamp, it is to be understood that the clamp may be employed for supporting various other wires, cables, conductors or the like, and the function of satisfactorily holding in normal position is present as well as the releasing under abnormal conditions.

It will be understood that while we have herein described in detail a particular embodiment of our invention for purposes of full disclosure, and some detailed features which we are specifically claiming for a special advantage, many changes and modifications may be made in the particular construction and arrangement of parts without departing from the broad scope of our invention which is outlined in the subjoined claims.

I claim:

1. In a suspension clamp for a conductor, the combination of a body for holding the conductor, a member for attaching said body to an insulator support, and means including an inherently-resilient element and cam means acting through said element for binding said conductor immovable within said body during a swing on each side of its normal vertical position and for automatically releasing said element to release the conductor to permit its relative movement to said body when said clamp has been swung through a predetermined angle either side of its normal vertical position.

2. In a clamp the combination of a body for receiving and supporting a conductor, a plate mounted within said body and in engagement with said conductor, a spring cooperating with said plate and adapted to exert pressure thereon to bind said conductor within said body, a member cooperating with said body and attached to an insulator for supporting said body and conductor, and a cam means engaging said spring and being movable by said member whereby said cam causes said spring to exert varying pressures on said plate.

3. In a suspension clamp the combination of a body for receiving and holding a conductor, a member for attaching said body to an insulator support, said member having a cam surface formed thereon, a plate engaging said conductor, a spring positioned in engagement with said plate and with said cam surface, said plate and said spring cooperating with said body and acting in response to said cam surface to bind said conductor within said body or to release said conductor to permit it to have relative movement to said body.

4. In a clamp for a conductor, the combination of a body for holding the conductor, a plate positioned within said body and adapted to engage said conductor, a resilient means associated with said plate, means for maintaining said plate and said resilient means within the confines of said body and permitting limited movements thereof within said body, a member for attaching said body to an insulator support, and a cam means responsive to movements of said member for forcing said plate by means of said resilient means to bind said conductor within said body under normal conditions of suspension and to release said binding under abnormal conditions of suspension.

5. In a suspension clamp the combination of a body for receiving and holding a conductor, a plate positioned within said body and in engagement with said conductor, projections on said plate to be received within recesses in said body for limiting the longitudinal movement of said plate, a spring mounted on said plate, projections on said spring and adapted to be received within said recesses to limit the longitudinal movement of said spring, a member pivotally connected to the upper portion of said body and adapted to attach said body to an insulator support, said member having a cam surface formed on its bottom edge for engagement with said spring, said cam surface formed to exert pressure when in a vertical position to bind said conductor within said body and to release the pressure when said member forms an angle to its normal vertical position to thereby permit said conductor to have relative movement to said body.

6. A transmission-line device comprising a supporting portion, a conductor-receiving portion relatively movably supported thereby and means disposed in operative relation to said portions for clamping a conductor relative to said receiving portion including a resilient element and common means for normally holding the element in stressed condition and for actuation by said supporting portion for releasing the resilient element in response to predetermined relative movement of said supporting and receiving portions to release the conductor.

7. A transmission-line device comprising means for clamping a conductor and responsice to predetermined movement of the conductor for releasing the same including a leaf-spring element extending along the conductor and means co-operating with an intermediate portion of said spring for flexing the same to clamping condition and releasing the spring to release the conductor.

8. A transmission-line device comprising relatively movable conductor-clamping members, a spring for pressing one of said members toward the other and means including a cam mounted on said other member for normally pressing the spring and responsive to predetermined movement of the conductor for releasing the spring to release the conductor in response to predetermined movement thereof.

9. A conductor-clamping device comprising a conductor-receiving channel member, a member pivotally connected thereto and a spring between said members to be normally held in stressed condition by said members in predetermined relative position thereof to clamp the conductor.

10. A conductor clamp comprising means to receive the conductor, and means for clamping the conductor relative thereto and responsive to predetermined movement of the conductor for releasing the same including a supporting element pivotally associated with said receiving means and an inherently-resilient element, said elements cooperating during and after release of the conductor to uniformly and gradually release and apply the clamping forces to retard movement of the conductor relative to the clamp in accordance with the forces tending to move the conductor.

11. A transmission-line device comprising a supporting portion, conductor-clamping portions supported thereby in relatively movable relation thereto and to each other, a resilient portion and a single means co-operating with said clamping portions for normally holding said resilient portion in stressed condition to clamp said clamping portions relative to the conductor and co-operating with said supporting portion for actuation thereby in response to movement of the conductor, said resilient portion being between the conductor position and said supporting portion.

12. In combination with cable-suspension means pivoted at its upper end for swinging movement, a cable support connected to the lower end thereof, said support including relatively movable cable-clamping portions and an elongated spring portion to be flexed laterally with respect to its length and to impose its force upon one of said clamping portions to hold the cable against movement relative to said means under normal conditions, and means for releasing said spring to release said clamping portions relative to each other and to the conductor for releasing the latter when said means swings from its normal position by excessive tensional strain on the cable at one side thereof, said spring portion being between the conductor position and said support.

13. In combination with cable-suspension means pivoted at its upper end for swinging movement, a cable support connected to the lower end thereof, said support including relatively movable cable-clamping portions and a single spring portion only to hold the cable against movement relative to said clamping portions under normal conditions, and means for releasing said spring to release said clamping portions when said means swings from its normal position beyond a predetermined extent, said spring portion being between the conductor position and said support.

14. In combination with cable-suspension means pivoted at its upper end for swinging movement, a cable support connected to the lower end thereof, said support including relatively movable cable-clamping portions and a spring adapted to flex along a line extending laterally to, and substantially through, the longitudinal axis of the cable to exert force symmetrically relative to the cable to hold the same against movement relative to said means under normal conditions, and means for releasing said spring to release said clamping portion when said means swings from normal position beyond a predetermined extent, said spring being between the conductor position and said support.

W. WARREN WOODRUFF, 3RD.
RALPH L. JENNER.